March 14, 1967 H. BRUN ETAL 3,309,672

ELECTRONIC COMPUTER INTERRUPT SYSTEM

Filed Jan. 4, 1963 2 Sheets-Sheet 1

INVENTORS:
H. BRUN
W. S. HUMPHREY, JR
J. TERZIAN

BY F. L. Sullivan

ATTORNEY

March 14, 1967 H. BRUN ETAL 3,309,672

ELECTRONIC COMPUTER INTERRUPT SYSTEM

Filed Jan. 4, 1963 2 Sheets-Sheet 2

INVENTORS
H. BRUN
W. S. HUMPHREY, JR
J. TERZIAN

BY

ATTORNEY

United States Patent Office 3,309,672

Patented Mar. 14, 1967

3,309,672

ELECTRONIC COMPUTER INTERRUPT SYSTEM

Herbert Brun, Newton, Mass., Watts S. Humphrey, Jr., Chappaqua, N.Y., and John Terzian, Winchester, Mass., assignors to Sylvania Electric Products Inc., a corporation of Delaware Filed Jan. 4, 1963, Ser. No. 249,387
4 Claims. (Cl. 340—172.5)

This invention is concerned with electronic data processing systems and particularly with an improved means for interrupting the program under solution in such systems.

A program interrupt unit is one which causes an unconditional transfer of control to a specified address in the computer memory, where a special program is located, upon the occurrence of some event such as overflow, error indications, certain input-output operations, etc. Since this happens randomly in time and the program is usually in the midst of an operation, it is necessary to provide a facility for remembering where the program was when it was interrupted so that the program can finish its operation after the program interrupt processing.

Hitherto, program interrupt units have provided a register for storing the contents of the program counter while program interrupt processing is proceeding. This is effective so long as only one source causes a program interrupt action at any given time, but a major problem arises when there are two sources active in succession. The first program interrupt signal transfers the contents of the program counter to the auxiliary register leaving the program counter in an empty condition. The next program interrupt signal repeats this action so that zero information is transferred from the program counter to the auxiliary register. This action is equivalent to clearing the auxiliary register so that the information telling where the program was is destroyed. One approach to the solution of this problem would be to use two auxiliary registers and load them in succession. This is effective for two sources, assuming that a program interrupt condition could not occur twice rapidly in succession from any one source, but the problem is not solved for more than two sources.

Another approach is to have each condition requiring a program interrupt set a flip-flop when it occurs, but this does not immediately cause a program interrupt signal to be generated since an interrupt cannot be initiated until the program interrogates these sensable flip-flops and finds at least one set. One disadvantage is that a serious condition could occur between periodic checks which would not be sensed by the program until much later. On the other hand, it may be undesirable to have the occurrence of any condition immediately cause a program interrupt since this condition may have a lower priority than the problem being solved by the computer.

Accordingly, a primary object of the present invention is to provide for data processing equipment an improved program interrupt technique and particularly one which retains program counter information, regardless of how many sources attempt to initiate a program interrupt and even if a succession of signals are received from any one source. A further object is to provide a priority program interrupt unit wherein an immediate program interrupt will be initiated only if it has a higher priority than the problem being solved.

These and related objects are accomplished in one embodiment of the invention by a program interrupt unit which features a plurality of sensable flip-flops each responsive to a different source requesting a program interrupt, a program interrupt flip-flop which initiates a program interrupt signal in response to a signal from any one of the aforementioned sensable flip-flops, an inhibiting flip-flop which prevents the program interrupt flip-flop from generating another program interrupt signal until the end of one cycle of program interrupt processing, since this would destroy the program counter information, and a plurality of decision flip-flops, each corresponding to one sensable flip-flop, which may be set by the program so as to prevent its sensable flip-flop from signaling the program interrupt flip-flop when the program interrupting condition is of low priority in comparison with the problem under solution by the computer.

Other objects and features of the invention will be apparent from the following description and reference to the accompanying drawings, in which.

Figures 1, 2:
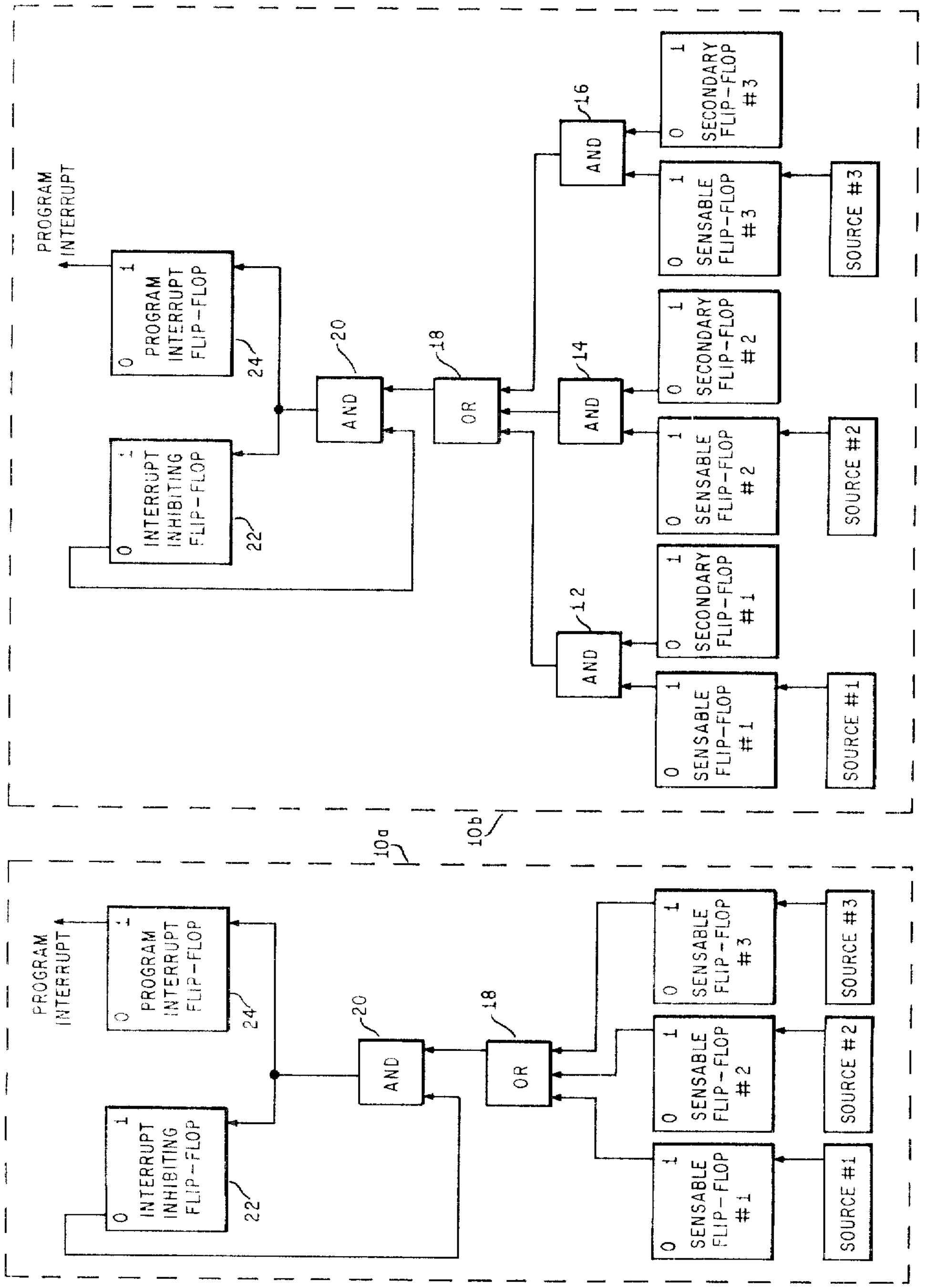
FIG. 1 is a diagrammatic representation of a program interrupt unit embodying the invention.
FIG. 2 is a diagrammatic representation of an alternative program interrupt unit embodying the invention; and, FIG. 3 is a diagrammatic representation of the use of a program interrupt unit with a computer for a real time condition of program interrupt.

One type of program interrupt unit 10*a* is shown in FIG. 1. It compises: a plurality of sensable flip-flops #1–3, each responsive to a different signal source; an OR gate 18, which passes a signal from any of these flip-flops #1–3; AND gate 20; a program interrupt flip-flop 24, which produces a program interrupt signal when enabled by the AND gate 20; and, an interrupt inhibiting flip-flop 22, which initially is set by AND gate 20 when the first signal is received from any source and in this condition inhibits AND gate 20 from causing program interrupt flip-flop 24 from sending out another program interrupt signal until the end of the program interrupt cycle when it is reset by the program of the central processor (not shown).

For illustative purposes three sensable flip-flops #1–3 are shown in FIG. 1 but the number which may be used in this invention is not limited and depends upon the number of sources which are capable of initiating a program interrupt such as overflow, error indications, certain input-output operations, etc. Assume that initially source #2 sends a signal to sensable flip-flop #2 causing it to be set so that a signal is sent through OR gate 18 to AND gate 20 is activated because interrupt inhibiting flip-flop 22 is in its reset condition and both program interrupt flip-flop 24 and interrupt inhibiting flip-flop 22 become set. Program interrupt flip-flop 24 then emits a program interrupt signal and is reset by the program. Now, should a signal be received from any source #1–3, the corresponding sensable flip-flop #1–3 is set causing OR gate 18 to be enabled and to send a signal to AND gate 20. This time AND circuit 20 is not activated because interrupt inhibiting flip-flop 22 is in the set condition so that a second program interrupt signal cannot be generated by flip-flop 24. The benefit of this will become evident below in the explanation of FIG. 3. At the end of the program interrupt processing, the program resets interrupt inhibiting flip-flop 22 so that a new program interrupt signal can be generated when the next signal is received from any source #1–3.

A modification of the program interrupt unit 10*a* of of FIG. 1 is shown as 10*b* in FIG. 2. A comparison of these two figures shows that they are identical with the exception of additional AND gates 12, 14, 16 and secondary flip-flops #1, #2, #3 in FIG. 2. It is often the case that the problem being solved by a computer, for instance the position of a missile in flight which is to be intercepted, is of a much higher priority than any one or all of the conditions which initiate a program interrupt. Hence, prior to solution of the problem, the program sets those secondary flip-flops #1–3 corresponding to the low priority conditions which should not interrupt it. For example, assume that the condition existing in source #2 possesses such a relatively low priority. The program sets secondary flip-flop #2 which places a ZERO at one input to AND gate 14, since it is connected to the reset side of secondary flip-flop #2. Consequently, when source #2 sets sensable flip-flop #2 for the purpose of causing a program interrupt signal to be generated by program interrupt flip-flop 24, AND gate 14 inhibits such action by preventing OR gate 18 from being enabled because one of its inputs is in the ZERO condition. The higher priority problem being solved thus continues without interruption.

Figure 3:
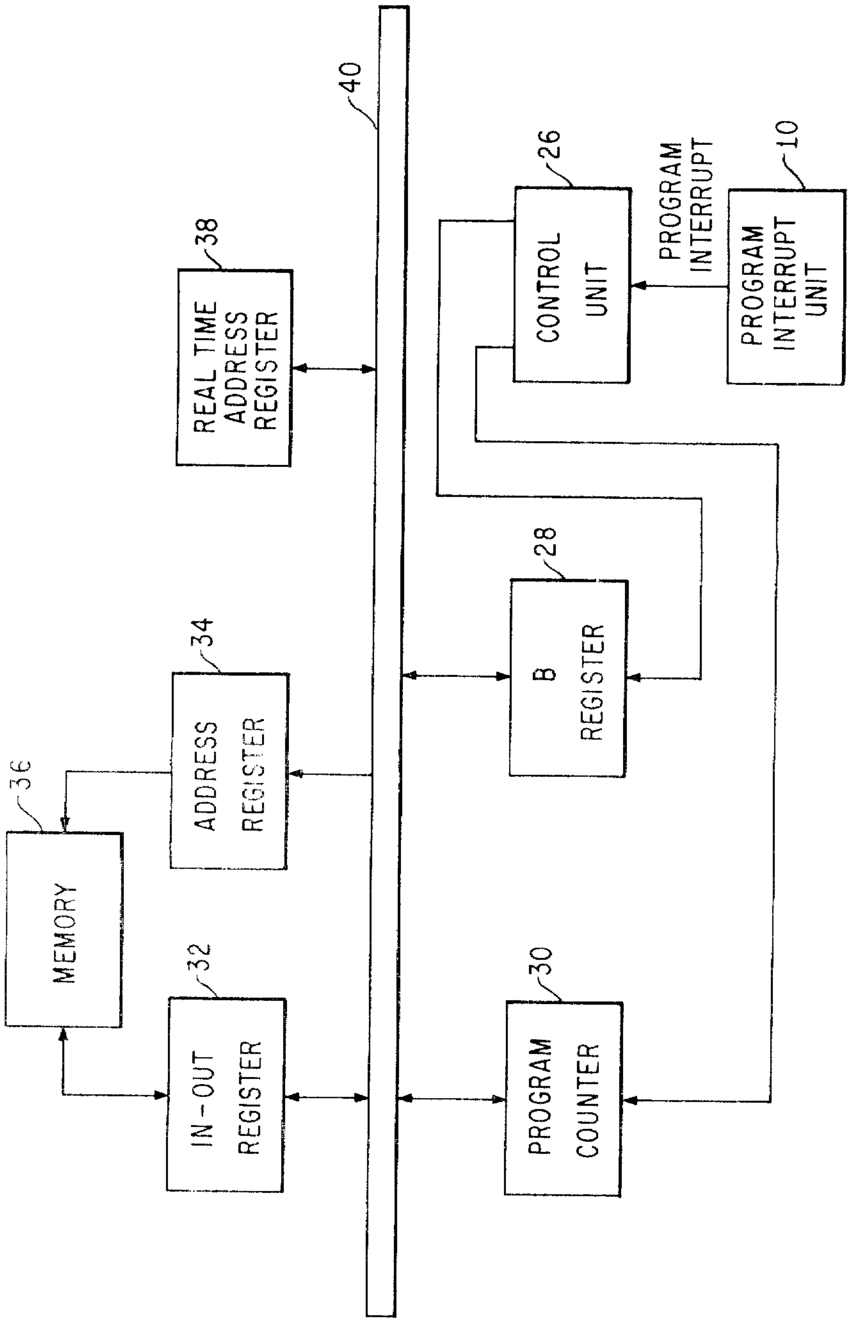

A specific condition causing a program interrupt in a particular computer system will now be explained with reference to FIG. 3. This computer system is disclosed in U.S. Patent No. 3,061,192, by John Terzian, entitled "Data Processing System," and assigned to Sylvania Electric Products Inc. The condition causing program interrupt is the occurrence of a control character in the real time system described in co-pending patent application Ser. No. 249,247, filed Jan. 3, 1963, now Patent No. 3,263,219, by W. S. Humphrey, Jr., J. Terzian, P. B. Greene, and H. Brun, entitled "electronic Data Processing Equipment" and assigned to the same assignee as the present application. This reference may be consulted for an explanation of the manner in which the control character is generated and a more detailed description of its purpose. Briefly, when one computer wishes to send data to another it will first send out a control character telling the other what to do with the data. This character is given maximum priority so that its receipt causes program interrupt unit 10 to immediately send out a program interrupt signal in the manner described with reference to FIGS. 1 and 2. The control character itself is stored in memory 36 by means of address register 34 and in-out register 32 as described in the aforementioned patent application and its address is stored in real time address register 38.

The program interrupt signal is received by control unit 26 which comprises standard logic gates and flip-flops and causes this unit 26 to generate a TRANSFER-IN level to B register 28 and a TRANSFER-OUT level to program counter 30. Consequently, the next address in the problem under solution is transferred out of program counter 30, over main bus 40, and into B register 28 where it remains stored until the end of the program interrupt processing operation. The program counter 30 now is set at address 000000000000 where the first instruction of the program interrupt processing cycle is stored. This address is then transferred over main bus 40 to address register 34, read out of memory, and carried into effect. The various sensable flip-flops #1–3 are now sensed by the program in the order of their priority. For the purpose of this example, assume that the control character has the highest priority and it has set sensable flip-flop #2. Therefore, the program senses this condition and recognizes that a control character has been stored. It next reads the address located in real time address register 38, which is the control character address as mentioned previously. This control character is then decoded and its order carried into effect. Sensable flip-flop #2 and interrupt inhibiting flip-flop 22 are then reset by the program so that upon the occurrence of the next program interrupt condition a program interrupt signal can be generated. If any other sensable flip-flop #1–3 has been set in the meantime, the program interrupt action will be automatically reinitiated.

Where there are many possible sources for causing program interrupt, the search for the highest priority sensable flip-flop condition can become quite time consuming. Thus it may be convenient to add a unit, connected between sensable flip-flops #1–3 and program counter 30, for the purpose of going immediately to the appropriate location in memory based on the type of source causing program interrupt rather than cycling through the sensing process. This unit will be controlled by control unit 26 and activated only when the program counter 30 has been emptied. It may comprise a logical priority matrix of AND and inverter circuits and a logical encoder. The priority matrix allows only one line corresponding to the highest priority, set sensable flip-flop to activate the encoder which generates the appropriate memory address to program counter 30.

A block diagram approach has been used throughout this specification so as to simplify the explanation. The various registers, control unit 26, and memory 36 of FIG. 3 and the manner in which data is read into and taken out of them are fully explained in the aforementioned references. The logic circuits of FIGS. 1 and 2 may be found in such standard references as Arithmetic Operations in Digital Computers, by R. K. Richards (Van Nostrand Publishing Co.) and Pulse and Digital Circuits, Millman and Taub (McGraw-Hill Publishing Co.).

The invention is not limited to the illustrative embodiments disclosed and should be accorded the full scope of the following claims.

What is claimed is:

1. For electronic data processing equipment operating according to the consecutive steps of a program, a means for interrupting said program upon the occurrence of a particular event and comprising: a plurality of sensable storage means; means for causing one of the storage means to generate a signal upon the happening of said event; means for initiating the program interrupt; gating means including an OR gate means connected to the plurality of sensable storage means and an AND gate means connected to the OR gate means and to the means for initiating the program interrupt for causing operation of the program interrupt initiating means; and, an inhibiting means connected to the AND gate means for preventing the program interrupt initiating means from causing a separate and distinct program interruption upon subsequent operation of any of the plurality of sensable storage means, including the sensable storage means effecting the initial program interruption.

2. For electronic data processing equipment operating according to the consecutive steps of a program, a means for interrupting said program upon the occurrence of a particular event and comprising: a plurality of sensable storage means; means for causing one of the storage means to generate a signal upon the happening of said event; means for initiating the program interrupt; gating means including a plurality of first AND gate means connected to the plurality of sensable storage means, an OR gate means connected to the plurality of first AND gate means, and a second AND gate means connected to the OR gate means and to the means for initiating the program interrupt for causing operation of the program interrupt initiating means; an inhibiting means connected to the second AND gate means for preventing the program interrupt initiating means from causing a separate and distinct program interruption upon subsequent operation of any of the plurality of sensable storage means, including the sensable storage means effecting the initial program interruption; and a means associated with each of said first AND gate means capable of preventing its associated sensable storage means from generating a signal upon the happening of an event.

3. In a data processing system having a multi-address random access memory for storing the consecutive steps of a program, a memory address register, and an in-out register, a program counter for storing the next memory address in said program, an auxiliary register, a means for interrupting said program upon the occurrence of a particular event including:

(a) a plurality of sensable storage means;

(b) means for causing one of the storage means to generate a signal upon the happening of the event;

(c) means for initiating the program interrupt; and (d) a gating means including an OR gate means connected to the plurality of sensable storage means, and an AND gate means connected to the OR gate means and to the means for initiating the program interrupt to cause operation of the program interrupt initiating means;

a control unit responsive to the program interrupt and causing the program counter address to be removed from the program counter and stored in the auxiliary register, and means connected to the AND gate means for preventing the program interrupt initiating means from causing a separate and distinct program interruption upon subsequent operation of any of the plurality of sensable storage means, including the sensable storage means effecting the initial program interruption.

4. In a data processing system having a multi-address random access memory for storing consecutive steps of a program, a memory address register, and an in-out register, a program counter for storing the next memory address in said program, an auxiliary register, a means for interrupting said program upon the occurrence of a particular event including:

(a) a plurality of sensable storage means;

(b) means for causing one of the storage means to generate a signal upon the happening of the event;

(c) means for initiating the program interrupt; and (d) a gating means including a plurality of first AND gate means connected to the plurality of sensable storage means, an OR gate means connected to the plurality of first AND gate means, and a second AND gate means connected to the OR gate means and to the means for initiating the program interrupt for causing the operation of the program interrupt initiating means;

a control unit responsive to the program interrupt and cauisng the program counter address to be removed from said program counter and stored in the auxiliary register, an inhibiting means connected to the second AND gate means for preventing the program interrupt initiating means for causing a separate and distinct program interruption upon subsequent operation of any of the plurality of sensable storage means, including the sensable storage means effecting the initial program interruption and, a means associated with each of said first AND gate means capable of preventing its associated storage means from generating a signal upon the happening of an event.

References Cited by the Examiner

UNITED STATES PATENTS

| | | | |
|---|---|---|---|
| 3,061,192 | 10/1962 | Terzian | 340—172.5 |
| 3,079,082 | 2/1963 | Scholten et al. | 340—172.5 |

OTHER REFERENCES

Pages 141–149, June 1958, "Realization of Randomly Timed Computer Input and Output by Means of an Interrupt Feature," authors L. R. Turner and J. H. Rawlings, IRE Transactions on Electronic Computers, volume EC–7, No. 2.

ROBERT C. BAILEY, *Primary Examiner.*

G. D. SHAW, *Assistant Examiner.*